US007937080B2

(12) United States Patent
Starks et al.

(10) Patent No.: US 7,937,080 B2
(45) Date of Patent: May 3, 2011

(54) WIRELESS MEASUREMENT DEVICE

(75) Inventors: Matthew Wayne Starks, Burlington, MI (US); Steven Louis Melvin, Scotts, MI (US); Kevin Dennis Snow, Augusta, MI (US)

(73) Assignee: Eaton Corporation, Cleveland, OH (US)

( * ) Notice: Subject to any disclaimer, the term of this patent is extended or adjusted under 35 U.S.C. 154(b) by 739 days.

(21) Appl. No.: 10/780,087

(22) Filed: Feb. 17, 2004

(65) Prior Publication Data

US 2005/0181781 A1 Aug. 18, 2005

(51) Int. Cl.
*H04W 24/00* (2009.01)

(52) U.S. Cl. ..... 455/423; 455/424; 455/425; 455/67.11; 455/115.1; 455/226.1

(58) Field of Classification Search .................. 455/423, 455/424, 425, 67.11, 115.1, 226.1
See application file for complete search history.

(56) References Cited

U.S. PATENT DOCUMENTS

| | | | | |
|---|---|---|---|---|
| 5,400,018 | A * | 3/1995 | Scholl et al. | 340/10.3 |
| 5,442,553 | A * | 8/1995 | Parrillo | 455/420 |
| 5,631,832 | A | 5/1997 | Hagenbuch | |
| 5,732,074 | A | 3/1998 | Spaur et al. | |
| 5,758,300 | A * | 5/1998 | Abe | 455/424 |
| 5,783,990 | A * | 7/1998 | Dambach | 340/438 |
| 6,141,610 | A * | 10/2000 | Rothert et al. | 701/35 |
| 6,263,268 | B1 | 7/2001 | Nathanson | |
| 6,266,527 | B1 * | 7/2001 | Mintz | 455/423 |
| 6,295,492 | B1 | 9/2001 | Lang et al. | |
| 6,308,065 | B1 * | 10/2001 | Molinari et al. | 455/424 |
| 6,604,033 | B1 | 8/2003 | Banet et al. | |
| 6,611,740 | B2 | 8/2003 | Lowrey et al. | |
| 6,636,790 | B1 | 10/2003 | Lightner et al. | |
| 6,819,924 | B1 * | 11/2004 | Ma et al. | 455/425 |
| 6,941,202 | B2 * | 9/2005 | Wilson et al. | 701/29 |
| 6,950,020 | B2 * | 9/2005 | Shimamoto et al. | 340/539.16 |
| 2002/0049077 | A1 * | 4/2002 | Baese et al. | 455/561 |
| 2002/0119769 | A1 * | 8/2002 | Heinonen et al. | 455/422 |
| 2002/0133273 | A1 | 9/2002 | Lowrey et al. | |
| 2002/0155816 | A1 * | 10/2002 | Fodor et al. | 455/67.1 |
| 2003/0162539 | A1 * | 8/2003 | Fiut et al. | 455/424 |
| 2003/0171111 | A1 | 9/2003 | Clark | |
| 2005/0079880 | A1 * | 4/2005 | Donner et al. | 455/466 |
| 2005/0221817 | A1 * | 10/2005 | Pinola | 455/423 |
| 2006/0079208 | A1 * | 4/2006 | Kim et al. | 455/412.1 |

FOREIGN PATENT DOCUMENTS

| | | |
|---|---|---|
| CN | 1468755 | 1/2004 |
| CN | 2599560 Y | 1/2004 |
| EP | 1 515 496 | 3/2005 |
| GB | 2 343 253 | 7/1999 |

(Continued)

OTHER PUBLICATIONS

International Search Report dated Jun. 8, 2005 (2 pages).

(Continued)

*Primary Examiner* — Temica M Beamer
(74) *Attorney, Agent, or Firm* — Rader, Fishman & Grauer PLLC

(57) ABSTRACT

The present invention comprises a system for viewing measurements remotely, including a first processor that is connected to a wireless communications device; a sensor; and at least one measurement device comprising a second processor programmed to (1) receive an input from the sensor and (2) wirelessly communicate with the first processor. The first processor is programmed to retrieve measurements from the measurement device via the wireless communications device.

29 Claims, 4 Drawing Sheets

FOREIGN PATENT DOCUMENTS

| | | |
|---|---|---|
| GB | 2 364 126 | 6/2000 |
| GB | 2 386 952 | 3/2002 |
| GB | 2 388 197 | 2/2003 |
| GB | 2410554 | 8/2005 |
| WO | WO-03/085617 | 10/2003 |
| WO | WO-2005/073671 | 8/2005 |

OTHER PUBLICATIONS

Examination Report dated Jan. 9, 2007 (4 pages).

* cited by examiner

WIRELESS MEASUREMENT DEVICE

BACKGROUND OF THE INVENTION

This invention relates to receiving, in a remote device through wireless communications, measurements from sensors attached to components in a piece of equipment, such as a vehicle.

Receiving information remotely from a vehicle is known in the prior art. U.S. Pat. Nos. 5,442,553, 5,758,300, 6,295,492, 6,604,033, 6,611,740, 6,636,790 and U.S. published application 2003/0171111 all describe communicating information from components in a vehicle, but teach doing so through a central processor or data collection module in the vehicle. U.S. Pat. No. 5,732,074 describes communication of vehicle data to a remote computer, but discloses that the communications take place via known data network protocols, such as CAN (controller area network). U.S. Pat. No. 6,263,268 teaches sending vehicle data to clients upon request using a server located on board the vehicle.

Thus, at present, a user must depend on intermediate mechanisms, such as a central processor or CAN communications, to retrieve data from a sensor on a piece of equipment such as a vehicle. Accordingly, the need exists for an invention that enables the direct communication of data from sensors to a remote user.

BRIEF SUMMARY OF THE INVENTION

The present invention comprises a system for viewing measurements remotely, including a first processor that is connected to a wireless communications device; a sensor; and at least one measurement device comprising a second processor programmed to (1) receive an input from the sensor and (2) wirelessly communicate with the first processor. The first processor is programmed to retrieve measurements from the measurement device via the wireless communications device.

DETAILED DISCLOSURE

System Overview

Figure 1A:
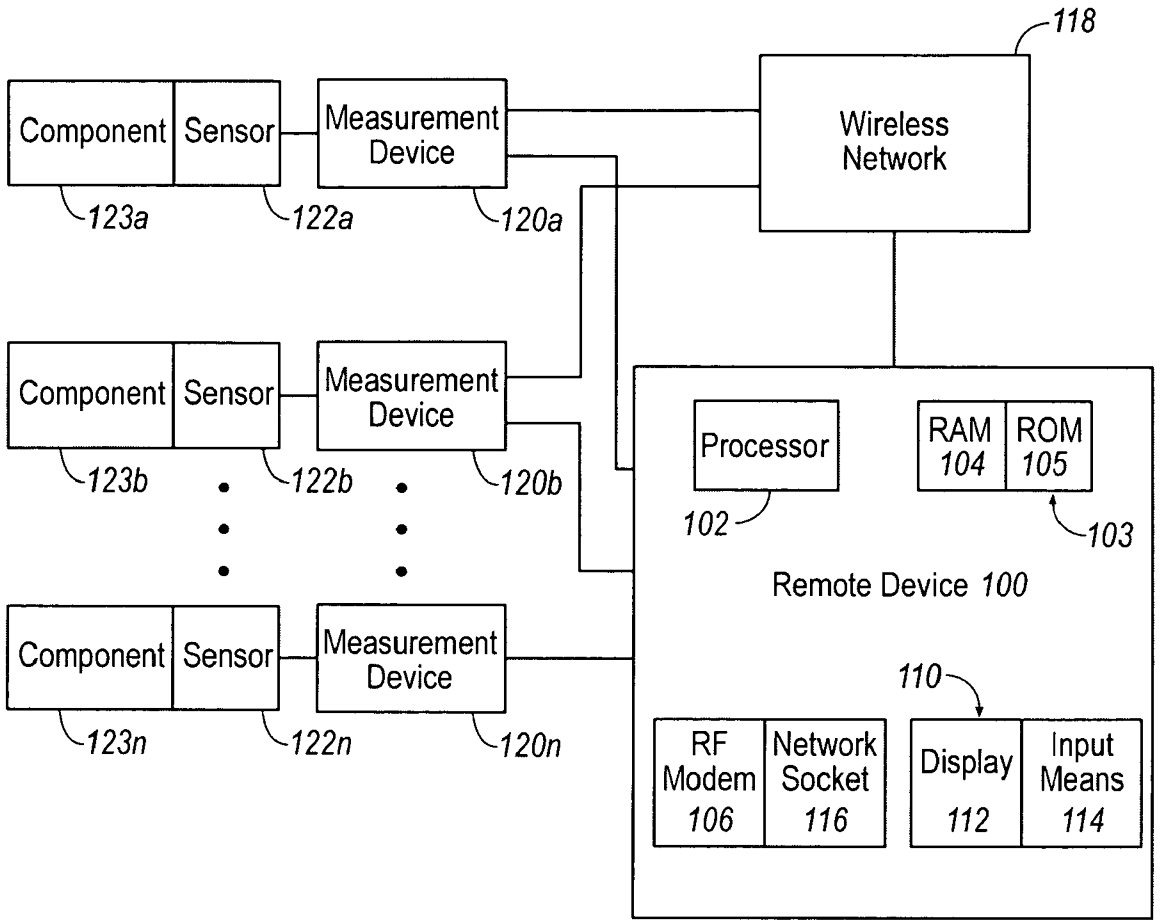
FIG. 1A provides a general overview of the invention.

FIG. 1A provides a general overview of the invention. Remote device 100 generally comprises a processor 102, a memory 103 comprising RAM (random access memory) 104 and ROM (read-only memory) 105, as well as RF modem 106. In most embodiments remote device 100 also comprises a user interface 110, which in turn comprises a display 112 and input means 114. Remote device 100 also comprises a network socket 116, through which network communications, including wireless communications, may occur. In some embodiments remote device 100 may be a personal laptop or desktop computer, a handheld computer such as a personal digital assistant or a Java™-enabled device, a cellular telephone, or some other computing device such as is known to those skilled in the art. Various displays and input means used with such devices are well known in the art, and may be used in the present invention.

RF modem 106 is used by remote device 100 to effect wireless communications, sometimes through a wireless network 118, using any one of a number of standards and technologies that are known to those skilled in the art, including but by no means limited to Bluetooth®, EEE 802.11, cellular networks, or any other form of wireless transmission known to those skilled in the art.

Software instructions loaded into RAM 104 from ROM 105 or some external medium are executable by processor 102 for configuring and retrieving data from at least one of measurement devices 120*a*, 120*b*, . . . , 120*n* attached to at least one of sensors 122*a*, 122*b*, . . . , 122*n*. Remote device 100 communicates either directly or through wireless network 118 with measurement devices 120*a*, 120*b*, . . . , 120*n*.

Sensor 122 comprises either a gauge or a transducer. Gauges and transducers in equipment, particularly vehicles, are well known to those skilled in the art. For example, gauges and/or transducers may be used to measure vehicle speed, or the pressure or temperature of a vehicle component 123 to which sensor 122 is attached or otherwise proximately located as appropriate.

Figure 1B:
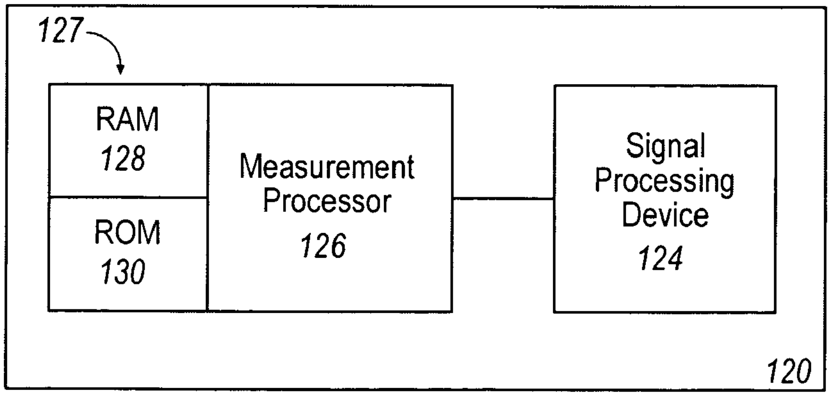
FIG. 1B provides a detailed view of a measurement device that can be attached to a sensor.

Measurement device 120 is shown in more detail in FIG. 1B. Measurement signal processing device 124 enables measurement device 120 to communicate with RF modem 106 via a direct wireless connection or via wireless network 118. In some embodiments, measurement signal processing device 124 is detachable from and interchangeable with each of measurement devices 120*a*, 120*b*, . . . , 120*n*, whereas in other embodiments measurement signal processing device 124 is a permanent portion of measurement device 120. Measurement signal processing device 124 further comprises a measurement processor 126 and a memory 127 comprising a RAM 128 and a ROM 130. Software instructions loaded into RAM 128 from ROM 130 are executable by the processor for recording, configuring, and sending information to a remote device 100.

Although the invention is described herein with respect to use with vehicles, it should be understood that the invention is by no means limited to such use and could be used with a wide range of equipment, whether stationary or mobile. Further, in one embodiment, component 123 can be subjected to diagnostic or analysis tests to assist in isolating problems. Remote device 100 may comprise a software program for diagnosing the condition of component 123 based on data received from measurement device 120. To take a simple example, a mechanic or technician might wish to perform a compression test on a cylinder. Measurement device 120 and sensor 122 would be placed in the cylinder, and the software program for diagnosing the condition of component 123 would analyze pressure readings received from measurement device 120 to determine whether or not the cylinder's performance fell into an accepted range.

Data Packet Structure

Figure 2:
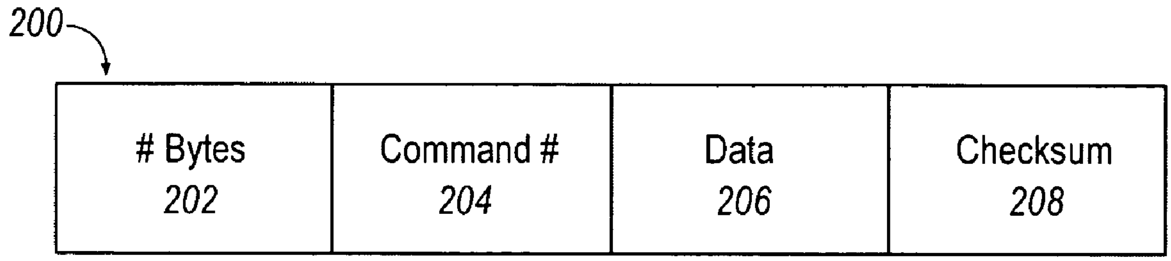
FIG. 2 describes the structure of data packets used in some embodiments of the invention.

FIG. 2 depicts the structure of a valid data packet 200 that may be used in some embodiments to enable communications between remote device 100 and measurement device 120.

Number of bytes field 202 indicates the number of bytes of data contained in valid data packet 200.

Command number field 204 indicates the type of command, i.e., the type of data that is being sent in valid data packet 200. For example, in one embodiment the command number is one-hundred if valid data packet 200 contains a standard broadcast of information from measurement device 120, and is two-hundred if valid data packet 200 contains a setup command sent from remote device 100 to measurement device 120 as described below with reference to FIG. 4.

Data field 206 contains the actual data that is being sent in valid data packet 200. In some cases this data comprises a setup command, i.e., configuration information, sent by remote device 100 to measurement device 120. In other cases data field 206 represents the determination by measurement device 120 of a reading taken from sensor 122. Data field 206 could contain the raw data output by sensor 122 and/or the reading determined by measurement device 24. Referring to the example given below with reference to Table 1, if sensor 122 was a pressure transducer that had output two volts, measurement device 120 would determine that sensor 122 had provided a reading of eight PSI, and the output of two volts as well as the reading of eight PSI could be included in data field 206.

Checksum field 208 contains a checksum that is used to validate the integrity of valid data packet 200, the use of checksums to validate data packets being well known in the art. In one embodiment, checksum field 208 is a twos complement of the sum of the bytes representing command number field 204 and data field 206.

Measurement Device Process Flow

Figure 3:
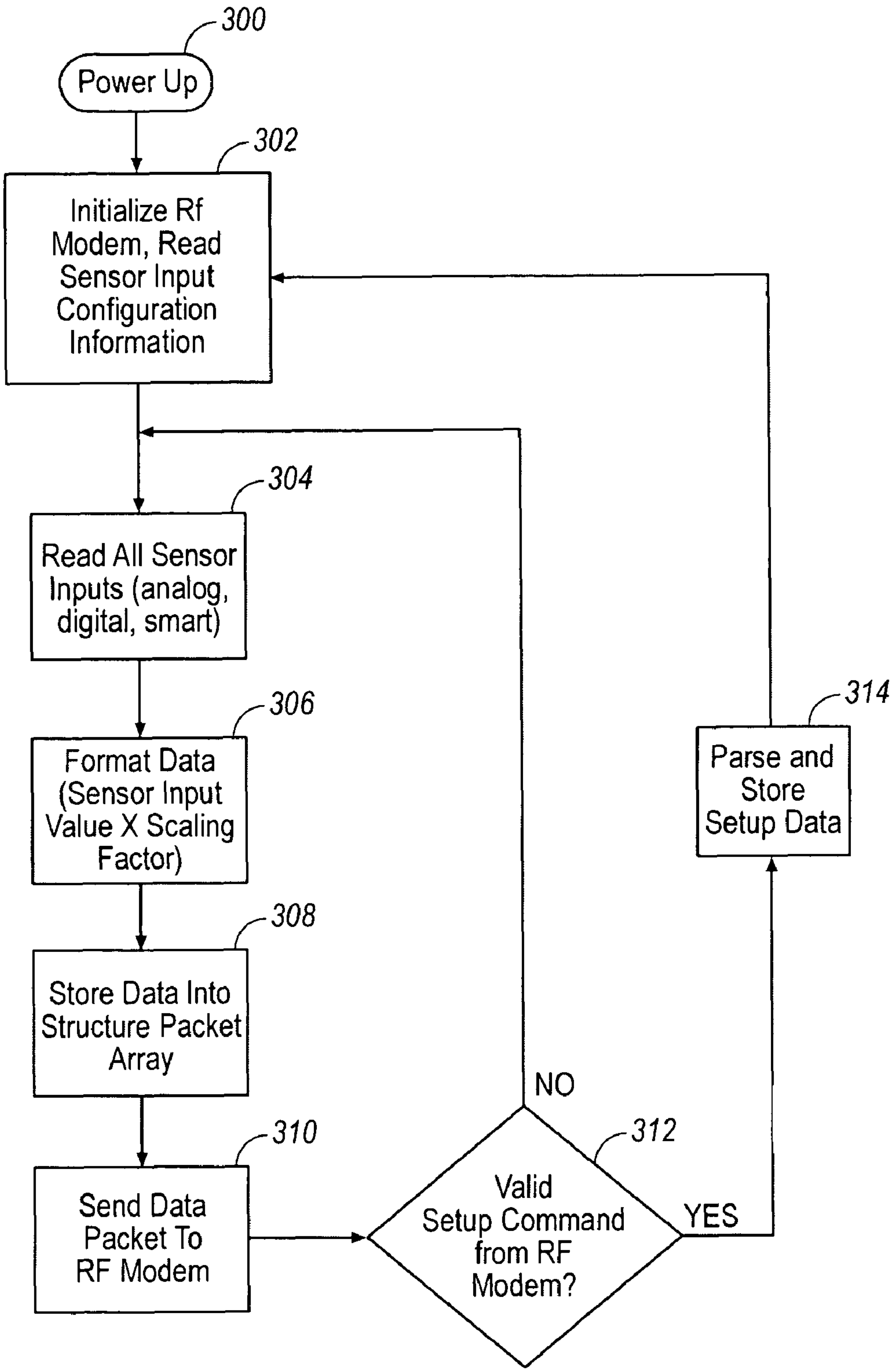
FIG. 3 describes the flow of programming instructions executed in a measurement device.

FIG. 3 describes the function of measurement device 120. In step 300, measurement device 120 is powered up. In some embodiments, this step is initiated when a vehicle engine is started. In other embodiments, one, some, or all of measurement devices 120*a*, 120*b*, . . . , 120*n* may be powered up on receiving a signal from remote device 100.

Next, in step 302, measurement device 120 is initialized. As part of this initialization measurement signal processing device 124 is initialized to enable communication with RF modem 106. This step comprises measurement device 120 loading configuration information into RAM 128, either by loading information stored in memory 127 of measurement device 120, or by receiving configuration instructions from remote device 100 via a setup command. Configuration information for measurement device 120 comprises the type of measurement for which it is to be configured (e.g., speed, pressure, temperature, etc.). Configuration information generally includes at least one scaling function, as discussed below with respect to step 306. Configuration information also generally includes an identification of the type of signal that measurement device 120 will be receiving from sensor 122 (e.g., type of digital or analog signal).

It should be understood that some configuration information may be obtained for storage in memory 127 by performing a calibration of measurement device 120. Such a calibration may be performed by capturing outputs from sensor 122 and associating such outputs with a known state of a component 123. For example, a calibration might comprise associating a voltage output from sensor 122 with a temperature of component 123. Further, those skilled in the art will recognize that performing a plurality of such calibrations would enable the creation of a scaling function as is described below with respect to step 306.

Returning to FIG. 3, next, in step 304, sensor 122 provides input or inputs to measurement device 120. These inputs may be in any of a number of formats known to those skilled in the art, such as known analog or digital signals. In embodiments in which sensor 122 is a gauge or transducer in a vehicle, sensor 122 typically provides analog signals in a range of between approximately four and approximately twenty milliamps or zero to approximately five volts.

Next, in step 306, measurement processor 126, executing software instructions contained in memory 127, formats the data input by sensor 122 for transmission to remote device 100. This formatting may comprise a number of different steps. If the data input by sensor 122 is in analog or some other format, measurement processor 126 converts the data to digital format using analog to digital or other conversion methods that are well known to those skilled in the art. Also in step 306, any required scaling function is applied to the data. The scaling function converts the raw output of sensor 122 to appropriately scaled measurement units representing a measurement read from sensor 122. The particular scaling function applied by measurement processor 126 will depend on the kind of sensor 122 whose output is being read; that is, as will be understood by those skilled in the art, different scaling functions will be appropriate for different kinds of gauges and/or transducers. Often, but by no means always, the scaling function will be linear.

To give one example of the processing performed in step 306, suppose that sensor 122 is a pressure transducer capable of providing output in a range from zero to five volts, representing pressure readings in a range from zero to twenty PSI (pounds per square inch). Table 1 below represents the scaling function used in this case by measurement device 120 to determine the pressure reading provided by sensor 122 based on the voltage output from sensor 122.

TABLE 1

| Sensor output (volts) | Pressure reading (PSI) |
|---|---|
| 0 | 0 |
| 1 | 4 |
| 2 | 8 |
| 3 | 12 |
| 4 | 16 |
| 5 | 20 |

It should be apparent that, in this example, the scaling function can be represented by the equation $P=4v$, where P represents the pressure reading of sensor 122 in PSI determined by measurement device 120 and v represents the output of sensor 122 in volts.

Measurement processor 126 may be programmed to apply the scaling function to data output from sensor 122. Alternatively, as will be understood by one skilled in the art, measurement processor 126 could be programmed to use a table such as Table 1 above to interpolate values for a measurement reading such as the pressure reading. For example, if sensor 122 output 2.25 volts, measurement processor 126 would determine that 2 is the closest number to 2.25 in the sensor output column of Table 1, and that therefore the reported pressure reading P is equal to a number bearing the same ratio to 8 as 2.25 bears to 2, i.e., the reading reported by measurement device 120 is 9 PSI.

Next, in step 308, the data input from sensor 122, having been converted to digital format and otherwise formatted, is stored into the memory of measurement device 120 as a structured packet array. Structured packets are well known, and those skilled in the art will recognize that a number of different structured packet formats could be used in the context of the present invention. Some steps below are discussed with reference to valid data packet 200, which is used in some embodiments.

Next, in step 310, measurement signal processing device 124 sends the data packet or packets created in step 308 to RF modem 106.

Next, in step 312, measurement processor 126 checks command field 204 of valid data packet 200 to see if a valid setup command has been received from remote device 10. If no setup command has been received, or if the received command was invalid, control returns to step 304. If a valid setup command has been received, control proceeds to step 314.

In step 314, the process parses the setup command and stores setup data contained in data field 206 in memory 127. The setup command generally will contain information identifying the kind of sensor 122 to which measurement device 120 is connected and the type of signal (e.g., analog or digital) that sensor 122 will provide as input. Those skilled in the art will recognize that setup data could be encoded into data field 206 in a variety of different ways. For example, when valid data packet 200 is used to send a setup command, data field 206 could comprise two bytes, wherein the first byte contains a code indicating the kind of sensor 122 to which measurement device 120 is connected and the second byte indicates the type of signal (e.g., analog or digital) that sensor 122 will output to measurement device 120. Of course, other data, such as a scaling function, could be included in data field 206.

Following step 314, control returns to step 302. The process described with reference to FIG. 3 is terminated when measurement device 120 is powered off. This may occur when measurement device 120 receives an instruction from remote device 100 to power off, or it may occur when, for example, a vehicle engine is powered off.

Remote Device Process Flow

Figure 4:
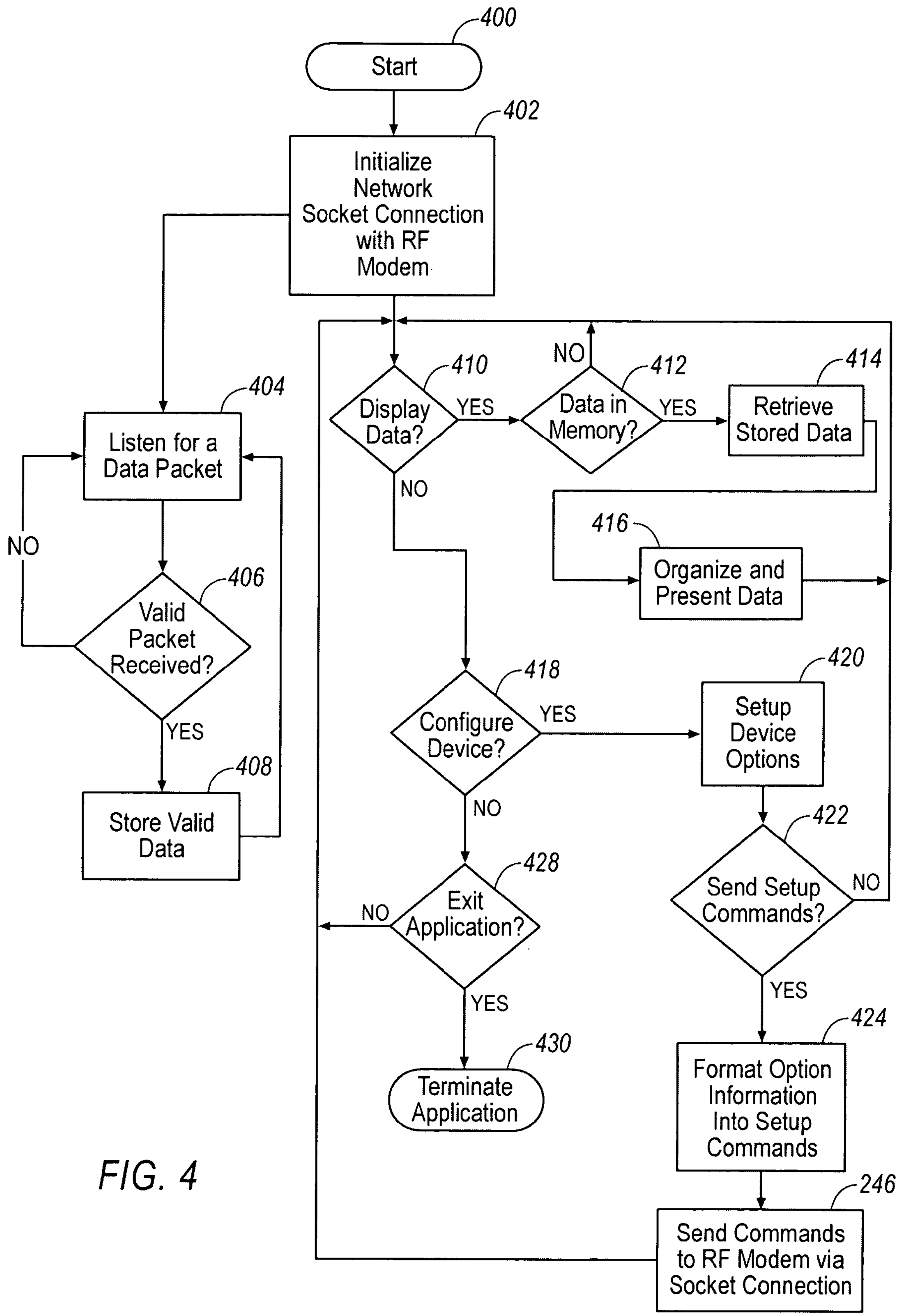
FIG. 4 describes the flow of programming instructions executed in a remote device that receives data from a measurement device.

The function of remote device 100 is described with reference to FIG. 4. In step 400, a software application running on remote device 100 is initiated. Next, in step 402, network socket connection 116 in remote device 100, connecting to RF Modem 106, is initialized. In some embodiments in step 402 preprogrammed configuration information, such as the configuration information described above with respect to step 302, is sent to at least one of measurement devices 120*a*, 120*b*, . . . , 120*n*. Control then proceeds simultaneously to steps 404 and 410. Steps 404-408 and 410-428 respectively run as first and second parallel processes until the software application is terminated as described below with reference to step 430.

The first parallel process begins in step 404, in which the process listens for data from measurement device 120. When data is received, control proceeds to step 406, wherein the process determines whether valid data packet 200 has been received, i.e., whether the received data conforms to the format of valid data packet 200. In particular, checksum field 208 is used to validate received data as described above. If the received data is not in the format of valid data packet 200, control returns to step 404. If the received data is valid data packet 200, control proceeds to step 408.

In step 408, valid data packet 200 is stored in RAM 104 of remote device 100. In some embodiments, valid data packet 200, when stored in RAM 104, is associated with a time stamp, i.e., the time at which valid data packet 200 was received from measurement device 120. The time stamp can be used, in certain embodiments that allow the user to graph the data received from measurement device 120, to provide values for the axis of a graph. It will be understood that, once data received from measurement device 120 is stored in RAM 104, in some embodiments such data may be stored on a computer readable medium or transferred to other computing devices through means that are well known in the art. However, in some embodiments, data received from measurement device 120 persists in RAM 104 only so long as remote device 100 is communicating with measurement device 120 and/or so long as the processes described with reference to FIG. 4 are running. Following step 408, control of the first parallel process returns to step 404.

The second parallel process begins in step 410, in which the process determines whether a user input requesting the display of information relating to at least one of measurement devices 120*a*, 120*b*, . . . , 120*n* has been received. If no, control proceeds to step 418. If yes, control proceeds to step 412.

In step 412, the process determines whether any data from at least one of measurement devices 120*a*, 120*b*, . . . , 120*n* has been stored in RAM 104 as described above with respect to step 408. If no, control returns to step 410. If yes, control process to step 414. In step 414, the proceeds to retrieve data stored in RAM 104.

Next, in step 416, the data is organized for display and displayed on display 112. As part of step 416 it should be understood that valid data packet 200 received in step 406 is parsed, using any of the techniques for parsing data packets that are well known to those skilled in the art, for information comprising readings received from measurement device 120 that are contained in data field 206 as described above. Data may then be presented to the user organized in a number of different ways that will be apparent to those skilled in the art. In most embodiments, data is organized according to which of components 123*a*, 123*b*, . . . , 123*n* to which it is related. As noted above, in some embodiments data from one or more of measurement devices 120*a*, 120*b*, . . . , 120*n* can be graphed over time; such data could also be displayed sorted by time stamps.

Step 416 is repeated for each valid data packet 200 that has been received, or for each valid data packet 200 that has been received since the last time step 416 was visited, if step 416 has been previously executed. Control of the second parallel process then returns to step 410.

In step 418, if a request to display data has not been received in step 410, the process determines whether a user input has been received requesting a configuration of at least one of measurement devices 120*a*, 120*b*, . . . , 120*n*. If no, control proceeds to step 428. If yes, control proceeds to step 420.

In step 420, options for configuring measurement devices 120*a*, 120*b*, 120*n* are displayed to the user on display 112. Configuring a measurement device generally comprises providing a measurement device with a scaling function. In some embodiments, the user is prompted to enter values into a sensor table following the format of Table 1 above. Values in a first column of the sensor table define possible values for output from sensor 122. Values in a second column of the sensor table define the readings that correspond to possible output values for sensor 122. For example, in Table 1 above, an output value from sensor 122 of two volts corresponds to a pressure reading of eight PSI.

Next, in step 422, the process determines whether it has been instructed to send setup commands to at least one of measurement devices 120*a*, 120*b*, . . . , 120*n*. If no, control returns to step 410. If yes, control proceeds to step 424.

In step 424, the process formats the selected setup options into defined setup commands. In some embodiments, this means that command field 204 has a value of two-hundred. In some embodiments, data field 206 will contain an identifier for measurement device 120. Also in some embodiments, data field 206 will contain a sensor table created in step 420 above and/or a scaling function.

Next, in step 426, the commands formatted in step 424 are sent to RF Modem 106 via network socket connection 116. RF Modem 106 in turn transmits the formatted setup commands to one, some, or all of measurement signal processing devices 124*a*, 124*b*, . . . , 124*n* as appropriate. Control of the second parallel process then returns to step 410.

In step 428, the process determines whether input has been received from the user requesting to exit the application. If no, control returns to step 410. If yes, the application, including both the first parallel process running as described with reference to steps 404-408 as well as the second parallel process running as described with reference to steps 410-430, is terminated in step 430.

CONCLUSION

The above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the field of wireless measurement and that the disclosed apparatus, systems and methods will be incorporated into such future embodiments. Accordingly, it will be understood that the invention is capable of modification and variation and is limited only by the following claims.

What is claimed is:

1. A system for viewing measurements remotely, comprising:

a processor that is connected to a first wireless communications device, the processor and the first wireless communications device being external to an equipment;

wherein the processor is programmed to retrieve, via the first wireless communications device, directly and not via a controller in the equipment, at least one measurement from each of a plurality of second wireless communications devices, each of the second wireless communications devices being connected to respective ones of a plurality of measurement devices in the equipment.

2. The system of claim 1, wherein the measurement represents at least one output from a sensor.

3. The system of claim 1, further comprising a user interface connected to the processor.

4. The system of claim 1, wherein the processor is further programmed to configure the measurement devices.

5. The system of claim 1, wherein the processor is further programmed to perform at least one of: displaying data that has been retrieved from the measurement devices, analyzing data that has been retrieved from the measurement devices, and storing data that has been retrieved from the measurement devices.

6. The system of claim 1, wherein the processor is included in a computer that is selected from the group consisting of a custom-designed computing device, a desktop personal computer, a laptop personal computer, a handheld computer, and a java-enabled portable computing device.

7. The system of claim 1, further comprising a wireless network.

8. The system of claim 7, wherein the wireless communications device sends signals to the measurement devices via the wireless network.

9. The system of claim 7, wherein the measurement devices send signals to the second wireless communications devices via the wireless network.

10. The system of claim 1, wherein the measurement devices are selected from the group consisting of a gauge and a transducer.

11. The system of claim 1, wherein at least one of the wireless communications devices is selectively attached to at least one second measurement output device.

12. A system for viewing measurements remotely, comprising:

a first processor that is connected to a wireless communications device;

at least two sensors that each provides at least one output related to a component in an equipment; and at least two measurement devices, each comprising a second processor programmed to (1) receive an input from the sensor and (2) wirelessly communicate directly, and not through a controller in the equipment, with the first processor via the wireless communications device, wherein the first processor is external to the equipment and is programmed to retrieve measurements from the measurement devices via the wireless communications device.

13. The system of claim 12, wherein the component is a component in a vehicle.

14. The system of claim 1, wherein the measurement relates to a component in the equipment.

15. The system of claim 1, wherein the equipment is a vehicle.

16. The system of claim 1, wherein the at least one measurement device is selectively detachably connected to a component in the equipment.

17. The system of claim 12, wherein the at least one measurement device is selectively detachably connected to the component.

18. A method for viewing measurements remotely, comprising:

receiving, in a plurality of second wireless communications devices, respective first communications from a first wireless communication device, the first wireless communications device being associated with a processor external to an equipment, and each of the second wireless communications devices being associated with one of plurality of measurement devices in the equipment;

providing at least one datum from the measurement devices to the second wireless communications device; and sending at least one second communication from at least one of the second wireless communications devices to the first wireless communications device directly and not via a controller in the equipment.

19. The method of claim 18, wherein the at least one datum represents at least one output from a sensor.

20. The method of claim 18, further comprising sending a third communication from the processor for configuring one or more of the measurement devices.

21. The method of claim 20, wherein the third communication is sent before the first communication.

22. The method of claim 18, further comprising performing at least one of: displaying data that has been retrieved from at least one of the measurement devices, analyzing data that has been retrieved, and storing data that has been retrieved.

23. The method of claim 18, wherein the processor is included in a computer that is selected from the group consisting of a custom-designed computing device, a desktop personal computer, a laptop personal computer, a handheld computer, and a java-enabled portable computing device.

24. The method of claim 18, wherein the first wireless communications device sends signals to the measurement devices via a wireless network.

25. The method of claim 19, wherein the second wireless communications devices send signals to the first wireless communications device via the wireless network.

26. The method of claim 18, wherein the measurement devices are selected from the group consisting of a gauge and a transducer.

27. The method of claim 18, further comprising selectively attaching at least one of the second wireless communications devices to at least one second measurement device.

28. The method of claim 18, further comprising selectively detachably connecting at least one of the measurement devices to a component in the equipment.

29. The method of claim 18, further comprising sending a plurality of second communications, each of the second communications being sent from a different one of the second wireless communications devices.

* * * * *